United States Patent [19]

Beebe

[11] 4,234,764
[45] Nov. 18, 1980

[54] LONG DISTANCE TELEPHONE CALL SECURITY SYSTEM

[76] Inventor: Ronald Beebe, 1159 Locke Ave., Simi Valley, Calif. 93065

[21] Appl. No.: 5,674

[22] Filed: Jan. 22, 1979

[51] Int. Cl.³ .................. H04M 1/66; H04M 1/36
[52] U.S. Cl. .................. 179/90 D; 179/18 DA
[58] Field of Search .......... 179/90 D, 18 DA, 189 D, 179/18 B; 340/149 R, 149 A, 164 B, 164 R

[56] References Cited

U.S. PATENT DOCUMENTS

| | | | |
|---|---|---|---|
| 3,513,271 | 5/1970 | Siathacopoulos | 179/90 D |
| 3,633,167 | 1/1972 | Hedin | 340/164 R |
| 3,757,055 | 9/1973 | McCann et al. | 179/90 D |
| 3,851,109 | 11/1974 | Downs et al. | 179/18 DA |
| 3,872,260 | 3/1975 | Oatis | 179/18 DA |
| 3,873,781 | 3/1975 | Nissin | 179/18 DA |
| 3,931,476 | 1/1976 | Matthews | 179/18 DA |
| 3,958,231 | 5/1976 | Hoffman | 340/149 A |
| 3,973,083 | 8/1976 | Sekiguchi | 179/90 D |
| 3,980,836 | 9/1976 | Chan et al. | 179/18 DA |
| 4,045,619 | 8/1977 | Harrington | 179/18 DA |
| 4,099,033 | 7/1978 | Murray | 179/90 D |

Primary Examiner—Gerald L. Brigance
Attorney, Agent, or Firm—Saidman & Sterne

[57] ABSTRACT

A self-contained electronic system which may be connected to either a standard dial telephone or push-button telephone for preventing use of the telephone for unauthorized long distance or toll calls. The system permits an authorized individual to key in a pre-determined security code to disable the long distance call prohibiting circuitry. In a preferred embodiment, when a "0" or "1" is detected as the first digit actuated, thereby indicating initiation of a long distance call, the telephone is disconnected from the trunk line or central office for a pre-determined time. During this time, an authorized user may input a three-digit security code to the telephone in a pre-determined sequence within a pre-determined time which will serve to reconnect the telephone to the trunk line to permit a long distance call to be made.

20 Claims, 6 Drawing Figures

LONG DISTANCE TELEPHONE CALL SECURITY SYSTEM

BACKGROUND OF THE INVENTION

1. Field of the Invention

The present invention is related to auxiliary telephone equipment and, more particularly, is directed towards a security system which may be adapted to be connected to standard dial or push-button telephone instruments for preventing long distance calls by anyone other than an authorized user.

2. Description of the Prior Art

The prior art is replete with both electrical, electronic and mechanical devices for preventing an unauthorized person from placing long distance calls on a telephone. Prior art U.S. patents in this area of which I am aware include: U.S. Pat. Nos. 3,284,578; 3,513,271; 3,757,055; 3,851,109; 3,872,260; and 3,973,083.

The McCann et al. patent (U.S. Pat. No. 3,757,055) is exemplary of many prior art systems in teaching a long distance call inhibitor which utilizes a counting circuit to count the number of digits dialed and causes the telephone lines to be opened when that count reaches eight. An alternative logic circuit is also provided which causes the telephone line to open whenever the digit "0" is among the first three digits dialed. This circuitry is typical of many prior art systems which simply disable the telephone when anyone attempts to place a long distance call.

The Oatis patent (U.S. Pat. No. 3,872,260) teaches another type of toll call prohibitor which detects removal of the receiver from a telephone instrument and also includes a series of counters which are programmed to count pulses derived from the make and break of the instrument dial, and means for determining the number of dial pulls in cooperation with a disallowed number detector for disconnecting the telephone upon detection of an unauthorized number being dialed.

The Stathacopoulos patent (U.S. Pat. No. 3,513,271) teaches circuitry which disables the telephone upon detection of the initial digit of a long distance code, such as a "0". This system includes mechanical switches which are operable by a locking cam which, in turn, is controlled by the manual turning of a key to permit an authorized user to disable the toll call inhibiting system.

The Sekiguchi patent (U.S. Pat. No. 3,973,083) discloses another type of toll call inhibitor which senses whether the number "1", the number "0", or one of the numbers "2" through "9" are dialed. This circuitry acts to disable the telephone when either the initial number is "0" or the first or second numbers are "1".

The Downs et al. patent (U.S. Pat. No. 3,851,109) discloses a system which interrogates dialed digits to determine if the dialed sequence is to be allowed or disallowed as a function of pre-programmed instructions. This patent contains a good description of the prior art in columns 1, 2 and 3.

Finally, the Evans patent (U.S. Pat. No. 3,284,578) illustrates an early electro-mechanical device which detects whether the second digit of an area code is a "0" or a "1", upon which the dial mechanism is locked to prevent further operation.

Each of the devices described in the foregoing patents suffers from a common deficiency. While teaching a multitude of different approaches for disabling the telephone when an unauthorized long distance call is attempted, none of the references incorporate a simple, foolproof, electronic system which permits an authorized user to overcome the disabling system. The closest prior art patent of which I am aware in this regard is Stathacopoulos (U.S. Pat. No. 3,513,271), but as pointed out above, this device requires insertion of a key to actuate a plurality of switches to overcome the toll call inhibiting device. As is well known, any security system which is key-operated may be easily defeated either mechanically, by force (disassembly of the key switch), or by one who through whatever means can come into possession of a key which turns the lock. Such systems are therefore severely deficient with respect to their true security capabilities.

It is towards overcoming the above-noted disadvantage that the present invention is advanced.

OBJECTS AND SUMMARY OF THE INVENTION

It is therefore a primary object of the present invention to provide a long distance telephone call security system which overcomes all of the disadvantages noted above with respect to prior art devices and systems.

Another object of the present invention is to provide a long distance telephone call security system which prohibits long distance telephone calls from being placed by unauthorized users while permitting authorized users to readily disable the long distance call inhibitor.

An additional object of the present invention is to provide a long distance telephone call security system which is entirely self-contained, and which may be adapted to be connected to either a standard dial telephone or standard push-button telephone.

Another object of the present invention is to provide a long distance telephone call security system which features an electronic coding network that enables an authorized user to enter, for example, a three-digit code into the telephone that acts to override the toll call inhibiting system, provided that the code is entered in proper sequence within a pre-determined time interval.

A still further object of the present invention is to provide a long distance telephone call security system which may be easily fabricated from readily available electronic components that are amenable to mass production and therefore may be economically marketed.

An additional object of the present invention is to provide a long distance telephone call security system which does not degrade standard telephone performance in any manner, but which enables the owner of the telephone to secure his telephone against unauthorized long distance use.

The foregoing and other objects are attained in accordance with one aspect of the present invention through the provision of a security system for a telephone instrument which is normally connected to a central office and which is operable by actuation of certain of a plurality of digits on the instrument. On this type of telephone instrument, a long distance call must be initiated by actuation of at least one pre-determined digit (usually "0" or "1") from the plurality of digits. The security system comprises first means responsive to the initial actuation of the pre-determined digit for disconnecting the telephone instrument from the central office for a first time period, and second means responsive during the first time period to the actuation of at least one additional digit pre-determined from the plurality of digits for reconnecting the telephone instrument to the central office to permit a long distance call to be completed.

In accordance with other aspects of the present invention, the second means may comprise means responsive during the first time period to the actuation of a plurality of additional digits pre-determined from the plurality of digits for reconnecting the telephone instrument to the central office. The means responsive during the first time period to the actuation of a plurality of additional digits may include means for reconnecting the telephone instrument to the central office only when the plurality of additional digits are actuated in a pre-determined sequence, and within a pre-determined second time period. More specifically, the means responsive during the first time period to the actuation of a plurality of additional digits may comprise a plurality of timing circuits equal in number to the number of the plurality of additional digits, the timing circuits having gate means connecting same for enabling a succeeding timing circuit only upon receipt by the gate means of an output from a preceeding timing circuit and the proper one of the pre-determined digits.

In accordance with other aspects of the present invention, the second means may include timing means for reconnecting the telephone instrument to the central office only for a second time period during which the long distance call must be completed. The second means may include means for disabling the first means for a second time period for permitting the pre-determined digit to be subsequently actuated without disconnecting the instrument.

In accordance with yet another aspect of the present invention, the telephone instrument security system may further comprise third means responsive to the initial actuation of a digit other than the pre-determined digit for disabling the first means and thereby permitting a local call using any of the plurality of digits to be completed. The first means then includes means for disabling the third means upon initial actuation of the pre-determined digit to prevent subsequent actuation of the digit other than the pre-determined digit from disabling the first means.

In accordance with yet other aspects of the present invention, the long distance telephone call security system further comprises fourth means connected between the telephone instrument and the first, second and third means for transforming the actuation of any of the digits on the instrument into signals for actuating the first, second and third means. In one embodiment, the fourth means comprises a dial-to-decimal decoding circuit means adapted to be utilized with a dial type of telephone instrument for providing a signal to the first means upon the dialing of the pre-determined digit, a signal to the third means upon the dialing of a digit other than the pre-determined digit, and a signal to the second means upon the dialing of the additional pre-determined digit. More particularly, the dial-to-decimal decoding circuit means may comprise digital means for counting the number of pulses generated by a dial pull, means for decoding the output of the digital counting means into a decimal number signal that is equivalent to the actuated digit, and a plurality of gate means for storing the decimal number signal. The decoding circuit means may further comprise timing means responsive to the pulses generated by the dial pull for resetting the digital counting means upon the conclusion of each dial pull. The timing means may further include means for enabling the plurality of gate means upon the conclusion of the dial pull in order to transfer the decimal number signal from the gate means to the first, second and third means.

In an alternate embodiment, the fourth means may comprise a tone-to-decimal decoding circuit means which is adapted to be utilized with a push-button type of telephone instrument for providing a signal to the first means upon the pressing of a push button having the pre-determined digit associated therewith, a signal to the third means upon the pressing of a push-button having a digit other than the pre-determined digit associated therewith, and a signal to the second means upon the pressing of a push-button having the additional pre-determined digit associated therewith. More particularly, the tone-to-decimal decoding circuit means may comprise means for detecting the frequencies of the tones generated when a push-button is pressed, a plurality of gate means connected to the detecting means for storing decimal number signals equivalent to the digit of the pressed push-button, and means for transferring the decimal number signal to the first, second and third means.

In accordance with other aspects of the present invention, the at least one additional digit may be provided by a connection from the output of at least one of the plurality of gate means to the second means, and the second means may be responsive to a plurality of additional digits by connections between a plurality of outputs of the gate means and the second means.

In accordance with a further aspect of the present invention, there may be included power supply means for providing power to the telephone instrument upon the disconnection thereof from the central office. The first means may include relay means having a first movable contact that normally closes a circuit between the telephone instrument and the central office, and a second movable contact which normally closes a circuit between the telephone instrument and the third means, the opening of the movable contacts bringing the power supply means into play.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

The present invention is particularly designed to be used with a telephone instrument, either push-button or dial, in a telephone system wherein one of the digits "1" or "0" is required to initiate a long distance or toll call. It will be understood, however, by a person of ordinary skill in the art that the principles of the present invention may be easily adapted to other long distance dialing systems which require either a different digit or a plurality of digits to be actuated to initiate a long distance or toll call. As utilized herein, the term "actuated" shall refer to either the pressing of a push button on a push-button style telephone or the dialing of a digit on a dial style telephone. Push-button telephones are presently marketed under the trademark Touchtone.

The present invention is designed to detect when a "0" or "1" is initially actuated by a user of the telephone instrument. Upon such detection, the telephone is disconnected from the telephone line or central office for a pre-determined time period of, for example, fifteen seconds. During this fifteen second interval, an authorized user may actuate a three digit code on the telephone instrument which, if accomplished in proper sequence, will reconnect the telephone instrument to the trunk line or central office. The authorized user may then complete a long distance call. Local calls, defined as those calls beginning with any of the digits "2" through "9", are not inhibited by the present invention.

The present invention, described in greater detail hereinbelow, consists essentially of its own power supply for providing power to the telephone when the disabling circuitry is actuated, decoding circuits (one for a dial telephone and one for a push button telephone) to convert the actuated digits into a decimal number signal, and logic and control circuitry for responding to the decimal number signals generated by the decoders for disabling the telephone to unauthorized users and reenabling the telephone when the authorized code is properly input. Each of these major components will now be discussed in turn.

POWER SUPPLY CIRCUIT

Figure 1:
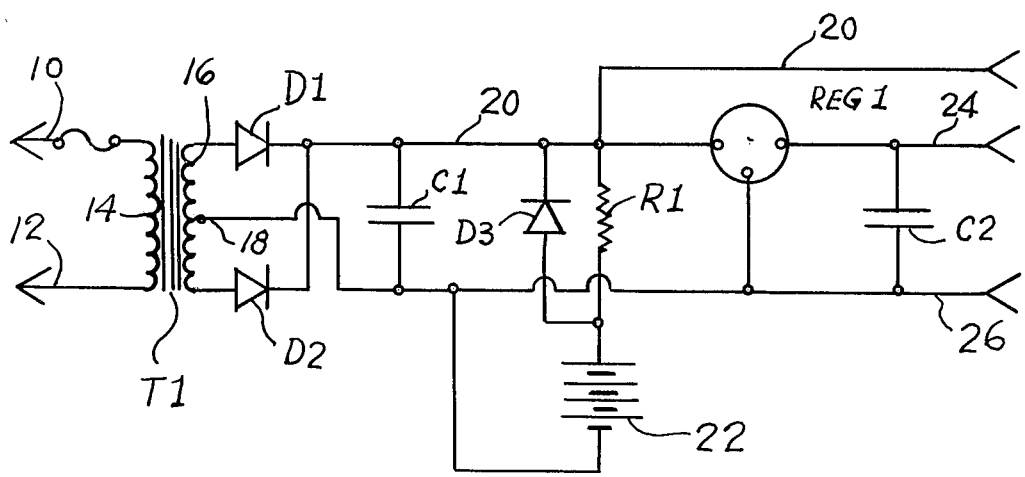
FIG. 1 is a schematic circuit diagram of a preferred embodiment of a power supply of the present invention.

Referring first to FIG. 1, there is illustrated a schematic circuit diagram of a preferred embodiment of a power supply for the present invention. A transformer T1 has a primary winding 14 which is supplied with standard wall current (115 VAC, 60 Hz) on lines 10 and 12. The secondary winding 16 includes a center tap 18 and full-wave rectifying diodes D1 and D2 for developing approximately 17 volts dc on line 20 across a filter capacitor C1. The voltage on line 20 is utilized to directly supply the telephone instrument during the time it is disabled, as will be described in greater detail hereinbelow.

The voltage on line 20 is fed to the input of a three-terminal regulator REG1 which provides a reduced dc voltage (e.g. 5 volts) output on line 24. Voltage line 24 is utilized to supply all of the electronics of the present invention. Another noise-filtering capacitor C2 is connected between the 5 volt line 24 and the return line 26.

A rechargeable battery 22 is preferably connected between return line 26 and the high voltage dc line 20. Rechargeable battery 22 may, for example, comprise a nickel-cadmium battery, and may be maintained in a charged state by allowing a small current to flow through resistor R1 to battery 22. If the wall current from lines 10 and 12 fails, battery 22 will supply the circuitry of the present invention, as well as the telephone instrument, through a diode D3. The power supply of FIG. 1 will operate equally well with either a dial type or push-button type of telephone instrument.

TELEPHONE INSTRUMENT

Figure 2:
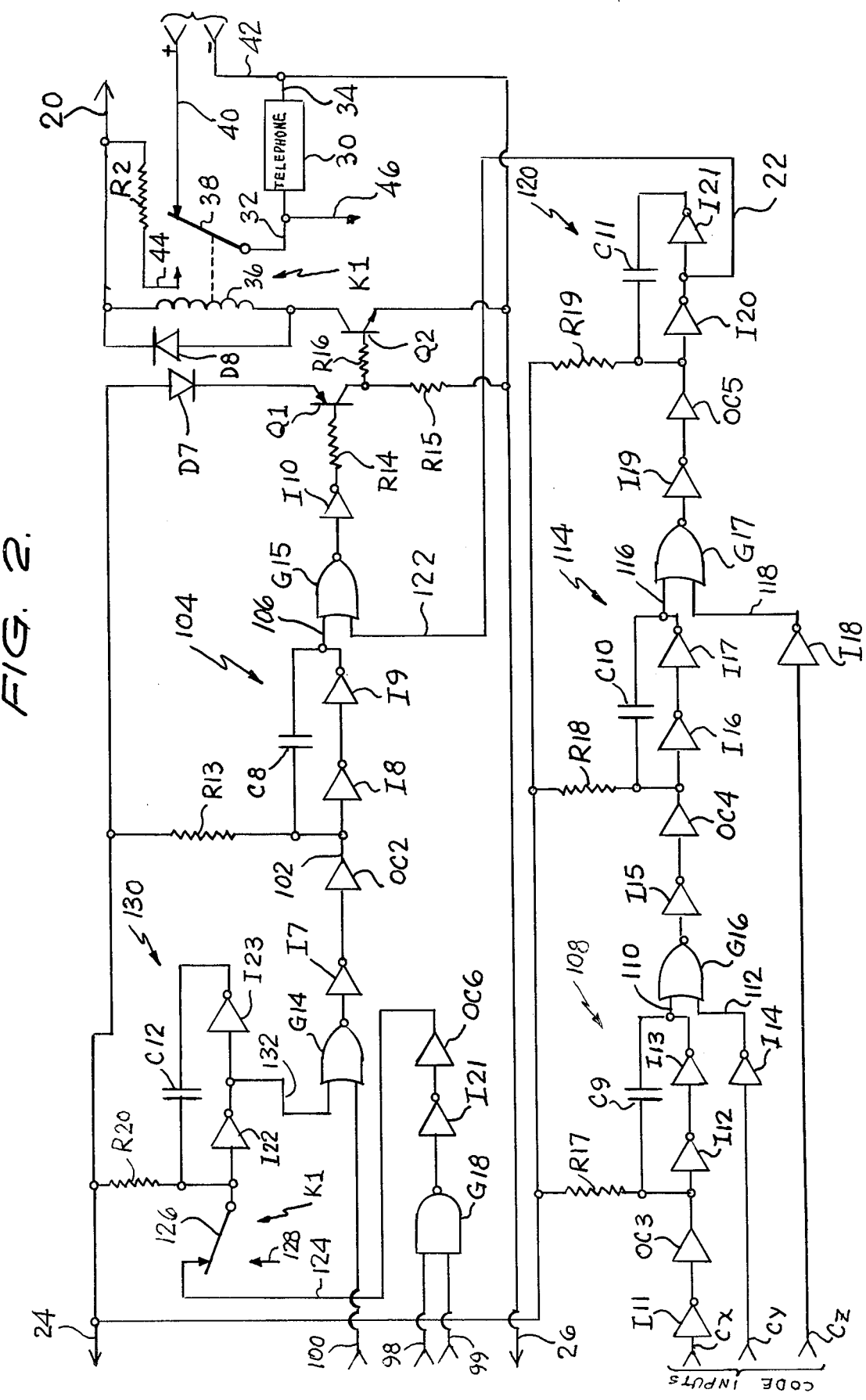
FIG. 2 is a schematic circuit diagram illustrating a preferred embodiment of a logic and coding circuit of the present invention.

Referring briefly to FIG. 2, a telephone instrument is indicated generally by reference numeral 30. As pointed out hereinabove, the telephone instrument 30 may be either of the standard dial type or standard push-button type. Reference numerals 32 and 34 indicate the output and return lines to the telephone instrument 30, which are normally connected to the telephone trunk lines 40 and 42 which, in turn, lead to the central office or switchboard of the telephone company. Interposed between lines 32 and 40 is a movable contact arm 38 which is part of a normally open relay K1. The actuating coil of relay K1 is indicated by reference numeral 36 and, upon actuation, serves to move contact arm 38 from line 40 to line 44. Such movement disconnects the telephone 30 from the main telephone lines 40 and 42, but power is still provided to the telephone 30 along line 44 by means of power supply line 20 and resistor R2. The electrical signals representing the digits which are actuated on the dial or push button telephone instrument 30 are fed through line 46 to appropriate decoding circuitry, to be described in greater detail hereinbelow, that will transform such signals into decimal number signals indicative of which digits were actuated. Such decimal number signals are fed to the remaining logic and control circuitry of FIG. 2 in order to sense whether a "0" or "1" is the first digit actuated. If so, relay K1 will be actuated, in a manner to be described in greater detail hereinafter, to disconnect the telephone instrument 30 from trunk lines 40 and 42. As will also be described in greater detail below, relay K1 will be deactivated thereafter if a proper three digit code is then actuated in proper sequence within a pre-determined time interval on telephone instrument 30.

Figure 3:
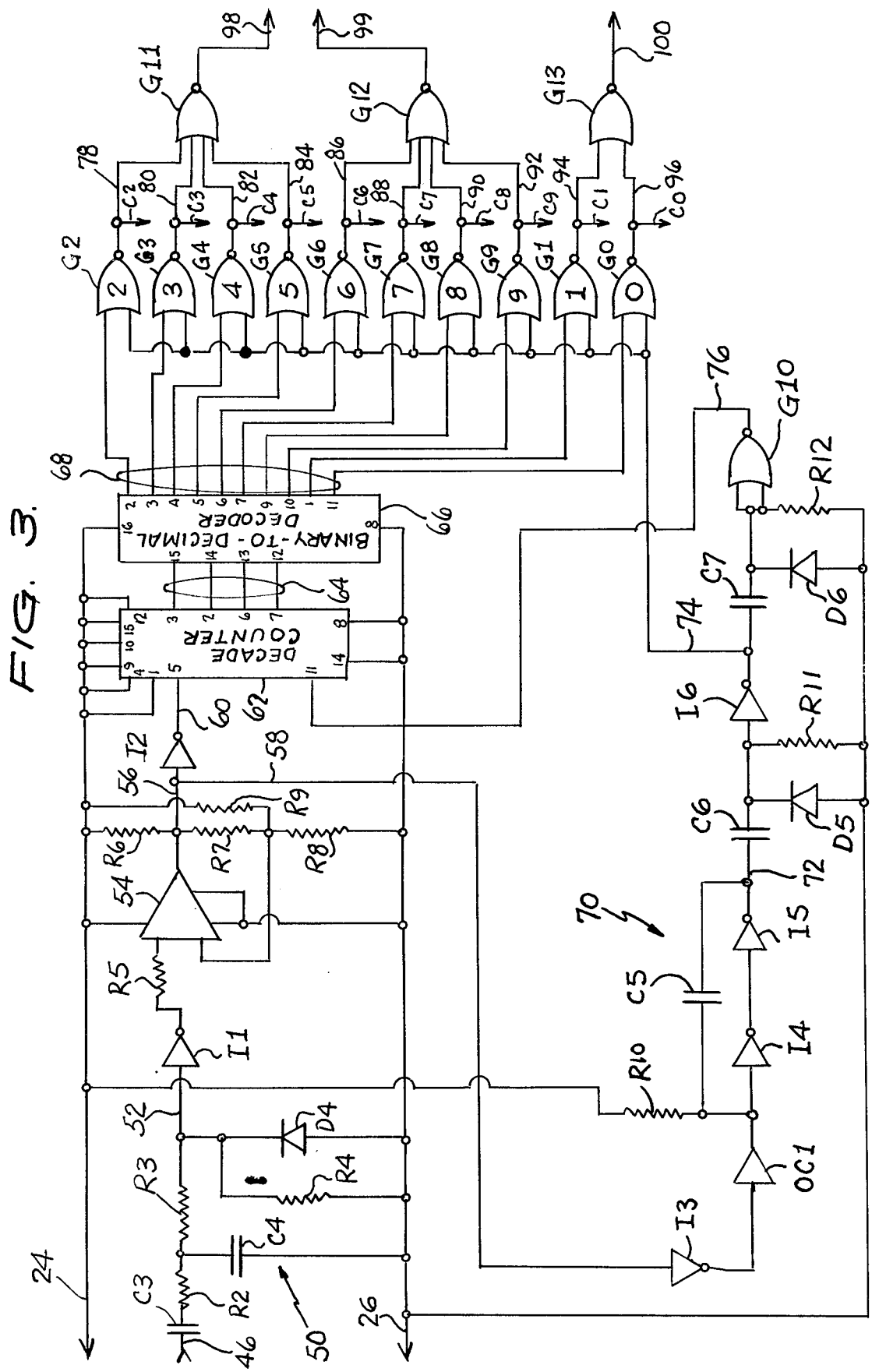
FIG. 3 is a schematic circuit diagram illustrating a preferred embodiment of a dial-to-decimal decoding circuit of the present invention.
Figure 4A:
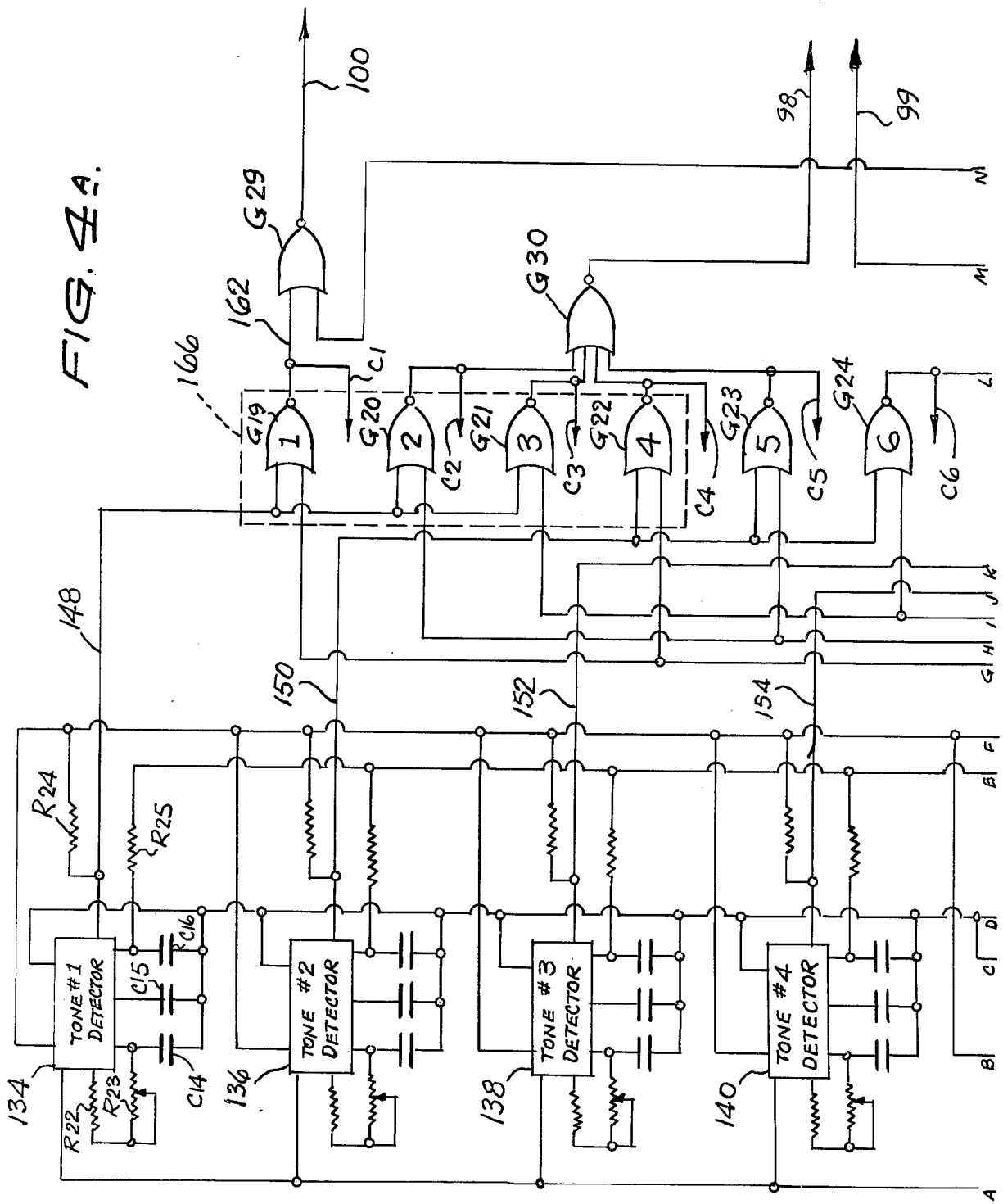
FIGS. 4A and 4B are schematic circuit diagrams illustrating a preferred embodiment of a tone-to-decimal decoding circuit of the present invention.
Figure 4B:
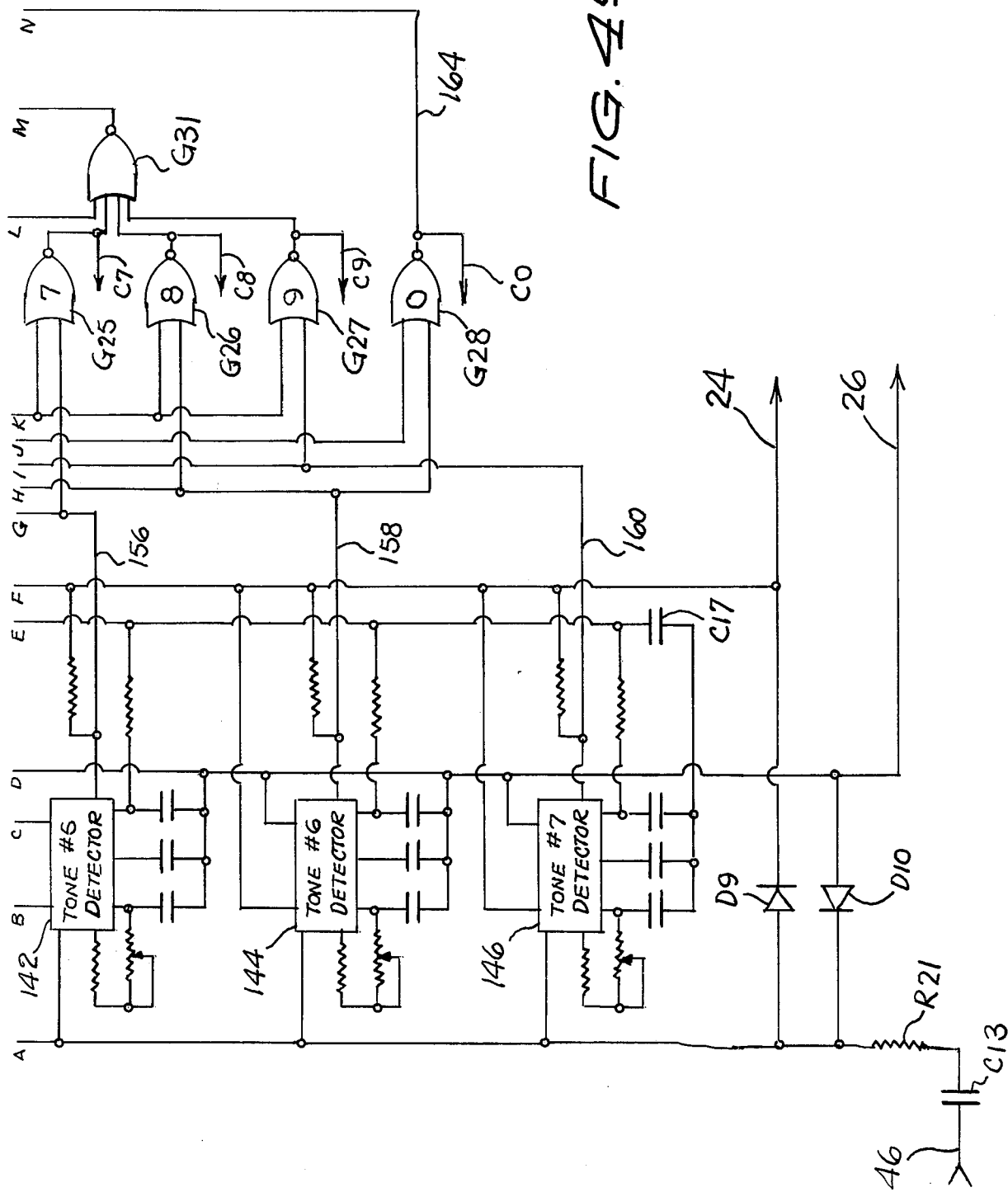

For a standard dial telephone, the signals representing the dialed digits are fed from line 46 to the dial-to-decimal decoder illustrated in FIG. 3, while for a standard push-button telephone, the signals representing the actuated digits are fed from line 46 to the tone-to-decimal decoder of FIGS. 4A and 4B. Each of these circuits will be considered individually.

DIAL-TO-DECIMAL DECODER

Referring now to FIG. 3, there is illustrated a schematic circuit diagram of a preferred embodiment of a dial-to-decimal decoder which is to be utilized with the present invention when the telephone instrument 30 is of the standard dial type. The function of the decoder of FIG. 3 is to convert each electrical signal repesenting a dialed number on line 46 to an equivalent decimal number signal. Briefly, if the digit "1" or the digit "0" is dialed, a "low" signal will appear on output line 100, while if any of the digits "2" through "9" are dialed, a "low" signal will appear on output lines 98 or 99.

A standard dial telephone generates a 10 Hz. square wave that completes one full cycle for the number of the digits dialed. That is, when a "1" is dialed, appearing on line 46 will be one cycle of a 10 Hz. square wave, and when a "5" is dialed, appearing on line 46 will be five cycles or pulses of a 10 Hz. square wave. These pulses must be counted and converted into a binary representation for use with the logic and control circuitry of FIG. 2. However, since the rise and fall times of the square wave generated on line 46 are very slow, they cannot be utilized directly to trigger an integrated circuit counter, and therefore some signal processing necessary.

The pulses appearing on line 46 are therefore initially fed through a filter circuit which is indicated generally by reference number 50. Filter circuit 50 includes a differentiating input capacitor C3 to isolate the leading edge of the incoming pulse. Resistor R2 and capacitor C4 act as an integrator to remove high frequency noise, while resistor R3 and diode D4 clip negative going transitions to provide a positive going transition at input 52 to inverter I1. Resistor R4 reestablishes the dc level of the position going pulse at point 52.

Inverter I1 preferably has considerable gain and feeds into one input of a comparator 54 through a resistor R5. Resistors R6, R7, R8 and R9 are configured to provide comparator 54 with a lrge amount of positive feedback to provide fast rise and fall times for the 10 Hz. square wave.

The output from comparator 54 is fed along line 56 to an inverter I2 and along line 58 to another inverter I3. The pulses on line 60 from inverter I2 have a sufficiently fast rise and fall time to trigger a decade counter 62. Decade counter 62 serves to count the pulses received along line 60 which, for a single dial pull, will be equal to the digit dialed. The output of the decade counter 62 is a 4-bit binary number equal to the digit dialed. This 4-bit binary number is fed to a binary-to-decimal decoder 66 which converts the 4-bit input into a decimal output by delivering a pulse on one of the ten output lines 68.

The output lines 68 from the binary-to-decimal decoder 66 are each connected as one input to ten EXCLUSIVE NOR gates G0, G1, G2, G3, G4, G5, G6, G7, G8 and G9. These gates are labeled in FIG. 3 by the number which repesents the digit dialed that the individual gate will be actuated by. The other inputs to each of the gates G0 through G9 are tied to a common input line 74, receipt of a signal on which serves to deliver the contents of the gates to their respective output lines, as will be described below.

it is clear that the contents of the gates G0 through G9 must be sampled for each dial pull. Since there is a very short duration between successively dialed digits, the outputs from gates G0 through G9 must be sampled during that short duration. The decade counter 62 must also be reset during that short duration to be cleared for counting the next dial pull. To accomplish these functions, the 10 Hz. square wave from comparator 54 is fed along line 58 through an inverter I3 and an open collector non-inverting buffer OC1 to enable resistor R10 to pull the output high. The output from open collector OC1 is fed to a one-shot timer 70 which comprises a pair of inverters I4 and I5 and associated timing components resistor R10 and capacitor C5. The time constant for one-shot 70 is preferably on the order of 180 milliseconds. Since the pulses from a single dial pull are being input to timer 70 every 100 milliseconds, one-shot 70 remains continuously reset as long as the dial is turning (i.e. generating pulses). The output at 72 therefore will stay low. However, 180 milliseconds after the dial has stopped turning, inverter I5 goes high and a pulse is coupled through capacitor C6 to inverter I6. Diode D5 is provided to clamp negative going pulses from inverter I5, which occur during dialing, to ground. Upon the conclusion of dialing, the output of inverter I6 is low and is fed along line 74 to enable each of the EXCLUSIVE NOR Gates G0 through G9. Prior to the conclusion of dialing, whereafter line 74 goes low, gates G0 through G9 are disabled. The output from gates G0 through G9 will go low upon receiving the dial-ending low signal along line 74 if their corresponding digit was dialed, as indicated by a high output from binary-to-decimal decoder 66. Output lines 78, 80, 82 and 84 of gates G2 through G5, respectively, are provided as inputs to exclusive NOR gate G11, whose output 98 goes low only if one of the digits "2" through "5" are dialed. Similarly, line 99 goes low only if one of the digits "6" through "9" are actuated, while line 100 goes low only if either of the digits "0" or "1" are dialed. At the conclusion of a dial pull, if none of the digits "2" through "9" were dialed, lines 98 and 99 go high, while if neither a "0" or "1" were dialed, line 100 goes high.

When inverter I6 resets, the positive going transition, at its output, is coupled through capacitor C7 to the tied-together input of gate G10. The output 76 from gate G10 then goes low for approximately 10 milliseconds and is fed to the reset input of decade counter 62, which causes all of the outputs 64 thereof to go to a logic high, thereby enabling it for the next dialed digit.

As pointed out above, the preferred embodiment of the present invention makes use of a three digit code that may be input by an authorized user to reenable the telephone after it has been disabled. Any three digit code may be preselected by hard wiring preselected outputs from the gates G0 through G9. The possible code output lines are indicated in FIG. 3 by C0, C1, C2, . . . , C9, which feed directly from the outputs of gates G0, G1, G2, . . . , G9. Commonly available switching apparatus may be provided to enable a user to reset the three digit code to any desired combination. Due to the exclusive NOR logic of the preferred embodiment, code lines C0 through C9 go low when the corresponding digit is dialed.

LOGIC AND CONTROL CIRCUIT

Referring back to FIG. 2, a preferred logic and control circuit is illustrated. This circuit is connected to receive the outputs from the dial-to-decimal decoder of FIG. 3 along lines 98, 99 and 100. As stated hereinabove, lines 98 and 99 go to a logic low whenever any of the digits "2" through "9" are dialed, while line 100 goes low whenever a "0" or "1" are dialed.

In addition, the circuit of FIG. 2 receives a three digit code input on lines designated by reference letters CX, CY and CZ, which may be tied to any three of the code output lines C0, C1, C2, . . . , C9 of FIG. 3, as explained hereinabove.

Line 100 is connected as one input to logic gate G14. The other input to logic gate G14 is from line 132, which is in a logic low state when none of the digits "2" through "9" have been dialed. Therefore, if a "0" or "1" has been actuated as the first digit in a sequence, both inputs to gate G14 will be low, thereby producing a logic high output which is inverted I7 and fed through a non-inverting open collector buffer OC2 at line 102. Line 102 is an input line to a one-shot circuit 104, which includes resistor R13, capacitor C8, and inverters I8 and I9. The values of resistor R13 and capacitor C8 are selected so that one-shot timer 104 has a predetermined period of approximately 15 seconds. The output from timer 104 is fed as an enabling input 106 to gate G15, whose output is, in turn, fed through an inverter I10 and resistor R14 to drive transistor Q1 into conduction via diode D7. When Q1 conducts, transistor Q2 is switched on through resistor R16. This, in turn, actuates relay K1 which causes contact arm 38 to pull from line 40 to line 44, thereby disconnecting the telephone 30 from the telephone lines 40 and 42. The telephone 30 will then be connected to the internal 17 volt power supply 20 through line 44 and resistor R2.

Relay K1 also controls a second movable contact arm 126 to pull same from line 124 to open-circuited line 128. This prevents any subsequently dialed digits "2" through "9" from disabling the relay K1.

With the relay K1 actuated, and the telephone 30 disconnected from lines 40 and 42, it will appear at the telephone switchboard or central office that the telephone 30 was hung up, and the "0" or "1" that was actuated will be disregarded. The relay K1 will remain pulled in for the full period of 15 seconds of the one-shot circuit 104. In summary, any time a digit "1" or "0" is detected as the first digit actuated, relay K1 will disconnect the telephone instrument 30 from the trunk lines 40 and 42 for 15 seconds, and the central office or switchboard will ignore the "0" or "1" signal.

During this 15 second period when relay K1 is actuated, however, a three digit code X, Y and Z may be input through the telephone 30 by an informed or authorized user that will allow a long distance call to be placed. The three digit code is detected at the code input lines CX, CY and CZ, which are taken directly off three preselected outputs of the gates G0 through G9 of FIG. 3. It will be recalled that, with the EXCLUSIVE NOR logic of the preferred embodiment, the inputs of lines CX, CY and CZ will go low when their corresponding digits X, Y and Z are actuated, respectively.

Assuming that the proper first digit of the code is applied to the CX input, it is fed through an inverter I11 and open collector OC3 to trigger a one-shot timer 108. Timer 108 comprises resistor R17, capacitor C9, and inverters I12 and I13. For a dial telephone, the time constant for timer 108 may be on the order of, for example, 4.6 seconds, whereas for a push-button telephone, the time constant may be somewhat shorter, such as 2.3 seconds. During the time that timer 108 is triggered, an enabling output 110 is provided to dual input gate G16. If the proper second digit of the code is actuated during the time interval set by timer 108, the other input 112 to gate G16 is enabled via line CY and inverter I14 to provide a signal for triggering a second one-shot timer 114. One-shot timer 114 includes resistor R18, capacitor C10, and inverters I16 and I17. The time period for timer 114 is selected to be approximately the same as that of one-shot timer 108, i.e. 4.6 seconds for a dial telephone and 2.3 seconds for a push button telephone. During such time period, an enabling input is provided on line 116 to gate G17.

If, during the second time period, the proper third digit is actuated, the signal on line CZ enables the other input 118 of gate G17 via inverter I18. This, in turn, triggers a third one-shot timer 120 through inverter I19 and open collector OC5. One-shot timer 120 includes resistor R19, capacitor C11, and inverters I20 and I21.

The third one-shot timer 120 has a relatively long time constant, when compared with timers 108 and 114. For example, for a dial telephone, R19 and C11 are selected to provide a 33 second period, while for a bush-button telephone, they are selected to provide a 19 second period, approximately.

When one-shot timer 120 is triggered, an output is provided on line 122 which is fed as an inhibiting input to gate G15. This serves to turn off transistors Q1 and Q2 which, in turn, causes the relay K1 to be deactivated. Contact arm 38 then returns to reconnect the telephone instrument 30 to the main telephone lines 40 and 42, while contact arm 126 returns from open circuit 128 to line 124. Relay K1 is therefore disabled for the entire period of one-shot timer 120, during which time a long distance call may be placed by the authorized user.

For normal local telephone calls, when a "0" or a "1" are not the first digits dialed, lines 98 or 99 will be low, thereby providing an output from NAND gate G18 through inverter I21 and open collector OC6 to trigger one-shot timer 130. Timer 130 includes resistor R20, capacitor C12, and inverters I22 and I23. The time constant for one-shot timer 130 is selected to be approximately 10 seconds for a dial telephone and 4.2 seconds for a push-button telephone. When triggered, one-shot timer 130 provides an output on line 132 which inhibits gate G14, so that any subsequently dialed "0" or "1" will not actuate relay K1 and will therefore not disable the telephone instrument 30 from the main lines 40 and 42. The period of timer 130, of course, may be varied as desired, and should be selected to provide sufficient time for any user to complete a normal local call.

PUSH-BUTTON-TO-DECIMAL DECODER

This circuit is illustrated in FIGS. 4A and 4B and is utilized in lieu of the circuit of FIG. 3 when the telephone instrument 30 comprises a push-button telephone. The circuitry of FIGS. 4A and 4B performs the same basic function of the circuitry of FIG. 3 of decoding the digits actuated by the user into usable digital signals for the logic circuit of FIG. 2. Note that the circuitry of FIGS. 4A and 4B receives the same input 46 as does the circuit of FIG. 3, and delivers the same outputs 98, 99 and 100.

Figure 5:
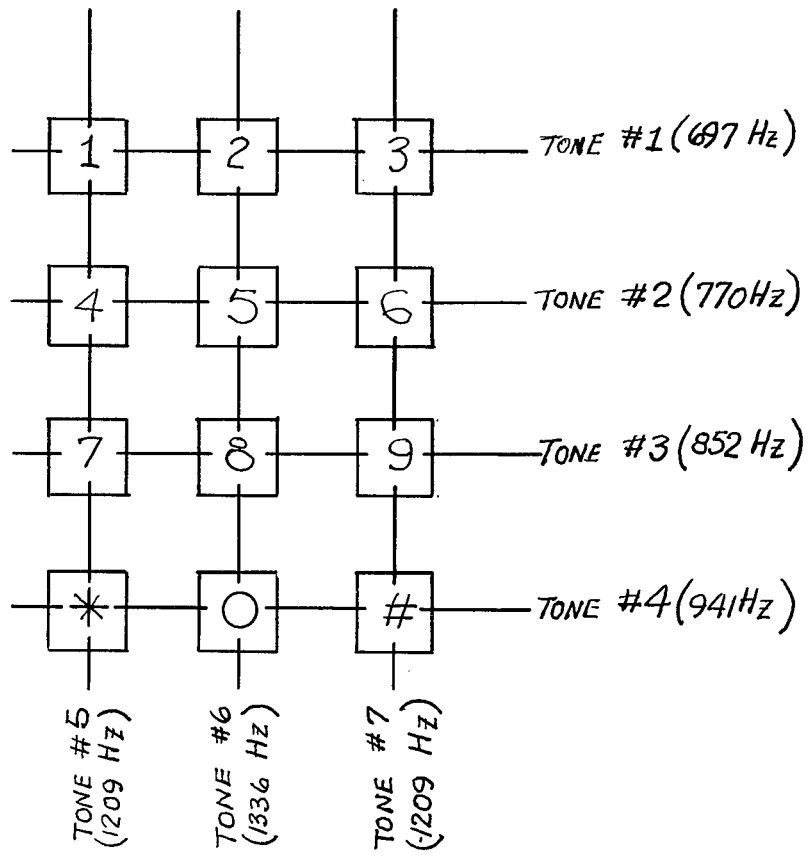
FIG. 5 is a diagram of the push buttons of a push-button style telephone which is helpful in understanding the operation of the decoding circuit of FIGS. 4A and 4B.

To more easily understand the circuit of FIGS. 4A and 4B, brief reference is made to FIG. 5, which illustrates a typical push-button telephone arrangement wherein the numbered squares represent the push-buttons inscribed with their corresponding digits. Presently marketed push-button telephones, known as Touchtone phones, utilize seven distinct frequencies, one for each row and column of push-buttons, so that when a single button is pushed, two frequency tones are simultaneously generated. For example, with reference to FIG. 5, when the digit "3" is actuated, tone #1 and tone #7 are simultaneously generated. When the digit "5" is actuated, tone #2 and tone #6 are simultaneously generated.

The function of the circuitry of FIGS. 4A and 4B is to therefore detect which of the two tones have been generated, to produce a signal representing such tones, and to convert this signal into a digital signal indicative of the digit whose push button was depressed. For this purpose, there are provided seven tone detectors 134, 136, 138, 140, 142, 144 and 146, each connected to receive the tones generated along line 46. The tone detectors 134 through 146 preferably comprise standard semiconductor IC chips, such as model LM 567 manufactured by National Semiconductor. Each tone detector, such as tone detector 134, includes various resistors R22, R23, R24, and R25, and capacitors C14, C15 and C16, connected thereto, whose values are selected to detect the desired frequency tone.

The output from the detectors 134 through 146 are fed along lines 148, 150, 152, 154, 156, 158 and 160 as inputs to the digit logic signal producing gates G19 through G28. The gates G19 through G28 are labelled according to the various digits represented. For example, G19 represents the digit "1" and will be enabled upon receiving inputs from both tone #1 detector 134 along line 148 and tone #5 detector 142 along line 156.

Gate G28 is the "0" digit detector and is enabled upon receiving an input from line 154 (tone #4) and line 158 (tone #6).

The outputs from gates G19 and G28 are tied as inputs 162 and 164 to a gate G29, whose output 100 goes low whenever a "0" or "1" is actuated on the telephone. Similarly, the output from gates G20 through G23 are fed as inputs to gate G30 whose output 98 goes low upon the actuation of any one of the digits "2" through "5", while output 99 from gate G31 goes low whenever one of the digits "6" through "9" are pressed on the push-button telephone.

As with the decoder of FIG. 3, any three of the outputs from gates G19 through G28 may be hard wired as the inputs for the three digit code X, Y and Z. The available coded output lines are indicated by C0 through C9.

BEST MODE PRESENTLY CONTEMPLATED FOR CARRYING OUT THE PRESENT INVENTION

The following is a list of parts which have been utilized to construct a working model of the present invention as described hereinabove. The parts list is intended to be exemplary of the best mode presently contemplated for carrying out the present invention, and it will be obvious to a person of ordinary skill in the art that other components and values may be utilized.

T1—Allied 6K48HF
D1, D2, D3—IN4003
C1—470 μF
R1—4.7 KΩ
REG1—UA 78 C05UIC
C2—33 μF
C3—1 μF, 200 v
R2—18 Kω
C4—0.33 μF
R3—18 KΩ
R4, R11, R12, R14, R15—100 KΩ
D4, D5, D6, D7, D8, D9, D10—IN4454
R5—5.6 KΩ
R6—1.2 KΩ
R7, R8, R9—12 KΩ
Decade Counter 62—Motorola MM 74C193
Binary-to-Decimal Decoder 66—Motorola MM 74C42
R10, R13, R17, R18, R19, R20—1 Megohm
C7, C6—0.15 μF
C8—22 μF
Q1—2N2907
Q2—2N2222
R16—10 KΩ
G18—Motorola MM 74C00
C13—0.5μF
R21—1KΩ
R22—6.2 KΩ
R23—10 KΩ
R24—22 KΩ
R25—4.7 KΩ
C14—0.1 μF
C15—2.2 μF
C16—1 μF
C17—250 μF
I1 through I23—Motorola MM74C04
OC1-OC6—Motorola MM 74C906
G0-G10, G13-G17, G19-G29—Motorola MM 74C02
G11, G12, G30, G31—RCA CD 4002 C
Tone Detectors 134-146—National Semiconductor LM 567

|        | Dial   | Push Button |
|--------|--------|-------------|
| C9, C10 | 6.2μF | 3.3μF |
| C11    | 47μF   | 27μF |
| C12    | 15μF   | 6.2μF |

Obviously, numerous modifications and variations of the present invention are possible in light of the above teachings. It is therefore to be understood that within the scope of the appended claims the invention may be practiced otherwise than as specifically described herein.

I claim as my invention:

1. A security system for a telephone instrument normally connected to a central office and operable by actuation of certain of a plurality of digits, and wherein a long distance call must be initiated by the initial actuation of at least one predetermined digit from said plurality of digits on the instrument, which comprises:
   first means responsive to the initial actuation of said predetermined digit for disconnecting said telephone instrument from said central office for a first-time period; and
   second means responsive during said first time period to the actuation of at least one additional digit predetermined from said plurality of digits for reconnecting said telephone instrument to said central office to permit a long distance call to be completed.

2. A long distance telephone call security system as set forth in claim 1, wherein said second means comprises means responsive during said first time period to the actuation of a plurality of additional digits for reconnecting said telephone instrument to said central office.

3. A long distance telephone call security system as set forth in claim 2, wherein said means responsive during said first time period to the actuation of a plurality of additional digits includes means for reconnecting said telephone instrument to said central office only when said plurality of additional digits are actuated in a predetermined sequence.

4. A long distance telephone call security system as set forth in claims 2 or 3, wherein said means responsive during said first time period to the actuation of a plurality of additional digits includes means for reconnecting said telephone instrument to said central office only when said plurality of additional digits are actuated within a second time period.

5. A long distance telephone call security system as set forth in claim 4, wherein said means responsive during said first time period to the actuation of a plurality of additional digits comprises a plurality of timing circuits equal in number to the number of said plurality of additional digits, said timing circuits having gate means connecting same for enabling a succeeding timing circuit only upon receipt by said gate means of an output from a preceeding timing circuit and the proper one of said predetermined digits.

6. A long distance telephone call security system as set forth in claim 1, wherein said second means includes timing means for reconnecting said telephone instrument to said central office only for a second time period during which said long distance call must be completed.

7. A long distance telephone call security system as set forth in claim 1, wherein said second means includes means for disabling said first means for a second time period for permitting said predetermined digit to be subsequently utilized without disconnecting said instrument.

8. A long distance telephone call security system as set forth in claim 1, further comprising:
third means responsive to the initial actuation of a digit other than said predetermined digit for disabling said first means and thereby permitting a local call using any of said plurality of digits to be completed.

9. A long distance telephone call security system as set forth in claim 8, wherein said first means includes means for disabling said third means upon initial actuation of said predetermined digit to prevent subsequent actuation of said digit other than said predetermined digit from disabling said first means.

10. A long distance telephone call security system as set forth in claim 8, further comprising fourth means connected between said telephone instrument and said first, second and third means for transforming the actuation of any of said digits on said instrument into signals for actuating said first, second and third means.

11. A long distance telephone call security system as set forth in claim 10, wherein said fourth means comprises dial-to-decimal decoding circuit means adapted to be used with a dial type of telephone instrument for providing a signal to said first means upon the dialing of said predetermined digit, a signal to said third means upon the dialing of a digit other than said predetermined digit, and a signal to said second means upon the dialing of said additional predetermined digit.

12. A long distance telephone call security system as set forth in claim 11, wherein said dial-to-decimal decoding circuit means comprises:
digital means for counting the number of pulses generated by a dial pull;
means for decoding the output of said digital counting means into a decimal number signal that is equivalent to the actuated digit; and
a plurality of gate means for storing said decimal number signal.

13. A long distance telephone call security system as set forth in claim 12, wherein said decoding circuit means further comprises:

timing means responsive to the pulses generated by said dial pull for resetting said digital counting means upon the conclusion of said dial pull.

14. A long distance telephone call security system as set forth in claim 13, wherein said timing means further includes means for enabling said plurality of gate means upon the conclusion of said dial pull to transfer said decimal number signal from said gate means to said first, second and third means.

15. A long distance telephone call security system as set forth in claim 10, wherein said fourth means comprises a tone-to-decimal decoding circuit means adapted to be used with a push button type of telephone instrument for providing a signal to said first means upon the pressing of a push button having said predetermined digit associated therewith, a signal to said third means upon the pressing of a push button having a digit other than said predetermined digit associated therewith, and a signal to said second means upon the pressing of a push button having said additional predetermined digit associated therewith.

16. A long distance telephone call security system as set forth in claim 15, wherein said tone-to-decimal decoding circuit means comprises:
means for detecting the frequencies of the tones generated when a push button is pressed;
a plurality of gate means connected to said detecting means for storing decimal number signals equivalent to the digit of the pressed push button; and
means for transferring said decimal number signals to said first, second and third means.

17. A long distance telephone call security system as set forth in claims 14 or 16, wherein said at least one additional digit is provided by a connection from the output of at least one of said plurality of gate means to said second means.

18. A long distance telephone call security system as set forth in claim 17, wherein said second means is responsive to a plurality of additional digits by connections between a plurality of outputs of said gate means and said second means.

19. A long distance telephone call security system as set forth in claim 8, further comprising power supply means for providing power to said instrument upon the disconnection thereof from said central office.

20. A long distance telephone call security system as set forth in claim 19, wherein said first means includes relay means having a first movable contact normally closing a circuit between said instrument and said central office, and a second movable contact normally closing a circuit between said instrument and said third means.

* * * * *